Figure 1:
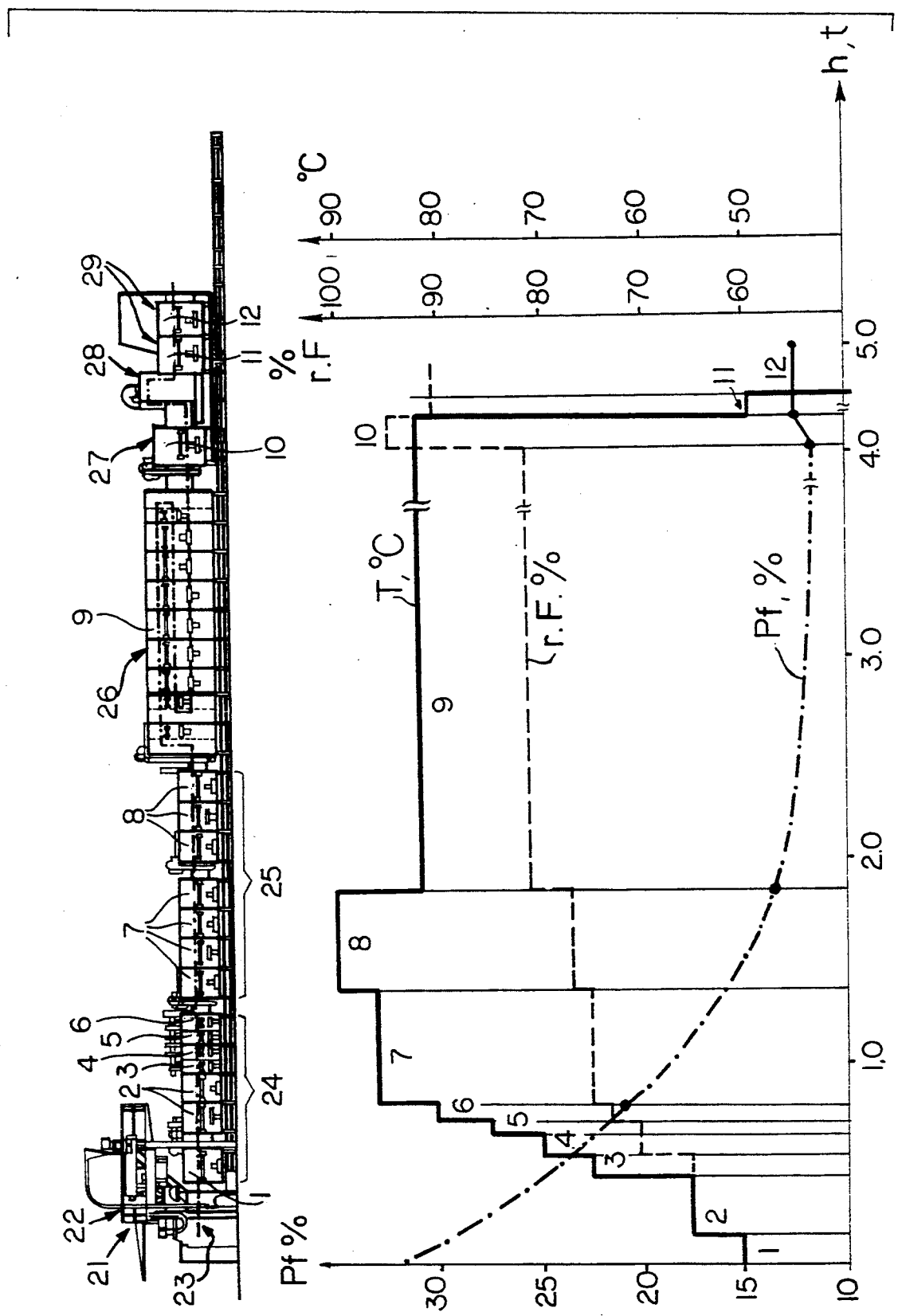

United States Patent [19]
Manser et al.

[11] Patent Number: 5,405,634
[45] Date of Patent: Apr. 11, 1995

[54] PROCESS FOR STABILIZING THE SHAPE OF PASTA

[75] Inventors: Josef Manser, Uzwil; Friedrich Egger, Niederuzwil; Werner Seiler, Zueberwangen, all of Switzerland

[73] Assignee: Buehler AG, Uzwil, Switzerland

[21] Appl. No.: 952,514

[22] PCT Filed: Apr. 1, 1992

[86] PCT No.: PCT/CH92/00060
§ 371 Date: Dec. 3, 1992
§ 102(e) Date: Dec. 3, 1992

[87] PCT Pub. No.: WO92/17074
PCT Pub. Date: Oct. 15, 1992

[30] Foreign Application Priority Data
Apr. 3, 1991 [CH] Switzerland ............... 988/91

[51] Int. Cl.⁶ .......................................... A23L 1/00
[52] U.S. Cl. ................................. 426/451; 426/458; 426/557
[58] Field of Search ............... 426/451, 458, 511, 557

[56] References Cited

U.S. PATENT DOCUMENTS 4,775,542 10/1988 Manser et al. ............... 426/451
4,830,866 5/1989 Manser et al. ............... 426/451

FOREIGN PATENT DOCUMENTS 0253307 1/1988 European Pat. Off. .
0322053 6/1989 European Pat. Off. .
437357 4/1912 France .
3241218C2 5/1983 Germany .
57-63061 4/1982 Japan .
59-95854 6/1984 Japan .
317991 1/1957 Switzerland .

OTHER PUBLICATIONS

Patents Abstracts of Japan, C-243 of Sep. 19, 1984, vol. 8/No. 205.
Patents Abstracts of Japan, C-116 of Jul. 28k 1982, vol. 6/No. 139.

*Primary Examiner*—George Yeung
*Attorney, Agent, or Firm*—McAulay Fisher Nissen Golberg & Kiel

[57] ABSTRACT

The invention concerns a novel process and a device for stabilizing the shape of both long and short pasta. A small amount of water, e.g. 0.4% to 1.2%, is added to the surface of the product while it is still hot in a water addition member (27) at the end of the drying or climate zone (9) and the product is then cooled in a cooling arrangement (29). The pasta are then stacked in the traditional manner for stabilizing insofar as this is required for the subsequent packaging process. In this way, subsequent cracking which was previously often unexplained can be avoided even when very extreme drying climates and short drying periods are used.

13 Claims, 6 Drawing Sheets

PROCESS FOR STABILIZING THE SHAPE OF PASTA

The invention is directed to a process for stabilizing the shape of pasta, wherein the product is pressure-molded from dough with an approximate water content of 28% to 35%, heated to higher temperatures, and dried to a moisture content of less than 13% for storing at room temperature.

Classic pasta drying is based on known thermal principles whereby heat is transmissible in three forms:
  radiation heat
  convection by transmission through air
  heat conduction (not important in pasta drying).

Concretely, the goal is an optimal drying process. Apart from management of the product and air temperatures, this is controlled chiefly by the relationship between the water content of the product and the relative humidity of the air. Assuming a difference in the equilibrium moisture between the product and the air, the drying process proceeds faster the higher the product temperature. This will be readily understood by the layman from experience in washing dishes in the kitchen; that is, drying should be effected at the highest possible temperature since moisture is transported fastest at higher temperatures. However, the pasta expert knows that only failure will result without controlling and adhering to proven conditions. Recent experience shows that very precise control over all drying conditions is necessary at temperatures above 70° C., in particular above 80° C. Extensive series of laboratory tests have even proven that there is a kind of "sound barrier" blocking a further intensifying of the drying process. When this is exceeded, e.g. a product of excellent value in terms of quality criteria which is placed on the table immediately after drying will break into many pieces without external forces. This breaking up sometimes takes minutes, sometimes hours or days.

The invention proceeds from the problem of designing the process in such a way that no "after-damage" occurs when employing high temperatures and short drying times and so that the best management of operations can nevertheless be applied vigorously and economically with respect to product quality.

The solution to this problem, according to the invention, is characterized in that the water content of the outer layer is increased in the final drying zone while the product is still warm, particularly by moistening the surface. In fact, there is no "after-damage" to the pasta products dried according to the invention, whether this is long pasta or short pasta, even under extreme climatic manipulation.

Products which were processed at the same time and with the same climatic conditions but without the addition of water according to the invention resulted in individual damage or total breakage depending on the test. This result can be traced back to great or extreme differences in tension within the product, particularly in the cooling phase at the end or near the end of the drying, since the surface is dried more intensively than the core of the pasta in traditional drying. Drying by evaporation proceeds so quickly in the final drying stage, particularly in the cooling zone, that there may be an insufficient amount of water flowing from the interior of the product to the outermost layers. The intensive action of the evaporating process when pure gasoline is applied to the hand is well known; the rapid evaporation draws warmth from the hand which gives the sensation of cooling. In the case of pasta, the evaporation heat is drawn off from the product. An excessive drying and brittleness of the boundary layer occurs. This results in a delayed shrinking process of the core of the product relative to the outer layers during cooling and accordingly in breaking tensions which can no longer be withstood by the outermost layer which has now become a crust.

This is counteracted by a deliberate increase in the water content in the outer layer which acts as a buffer allowing a more uniform reduction in the humidity and temperature inside and outside the product. The addition of water to the surface provides a compensation of tension particularly in the cooling phase. At higher temperatures, the water penetrates very quickly into the surface and additionally imparts a plastic or elastic behavior to the outermost layer. In this way it is possible to avoid completely a brittleness and cracking during the relatively short period of reduction in temperature e.g. from 90° C. to 25° C. Drying can be reduced to below the desired final value beforehand so that, on the average, the product has the desired final water content again only after the addition of water. An essential idea of the invention consists in that the surface of the product is moistened after drying at a high temperature prior to a rapid reduction of the temperature of the product.

The invention allows for various particularly advantageous constructions. It is suggested that 0.1% to 2%, preferably at least 0.4% to 1.2%, water be added with respect to the entire product.

The best results are achieved, even with very intensive drying, when the addition of water is effected at a product temperature in excess of 60° C., preferably even in excess of 75° C. After pressing, long pasta are first heated to more than 80° C. in less than an hour and are dried to approximately 13% moisture content in 2 to 4 hours at high temperature. Short pasta are heated to more than 80° C. in a similar climate in less than 30 minutes and are dried at high temperature in 1 to 3 hours.

Another essential fact consists in that the addition of water is effected over a short period of time of 3 to 20 minutes, preferably 5 to 10 minutes, so that a relatively small percentage of water penetrates only into the surface and is not distributed over the entire cross section, which would increase the drying time. For example, assuming that the water only penetrates in a layer of 1/10 the thickness of the product, e.g. spaghetti, during the water addition period, a 1% water addition to only 1/10 of the product gives a moistening of 10%. This means that a product dried e.g. to 12.5% has a corresponding water content after the addition of water to the outermost layer. Immediately after the addition of water, the product temperature is reduced to less than 60° C., preferably less than 30° C. or even to the ambient temperature in the event that water is added at the end of drying.

In the case of products which are particularly susceptible to breakage, additional water can be added to the surface of the pasta for 5 to 10 minutes after the main drying or prior to the final drying at a product moisture content of less than 15%. Thus, in this case water is added twice. The addition of water can be effected by means of vapor or mist.

The invention is further directed to a device for stabilizing the shape of pasta which includes a dough press, a continuously operating tunnel dryer with climate control by member or zone, respectively, and is characterized in that a water addition member is arranged preferably at the end of the drying. It is particular important that control means be associated with the moistening member so that the addition of water can be limited with respect to time and the amount of water and climate can be monitored in a precise manner.

Further, it is important that the water addition member include means for maintaining a climate at high temperature. A moistening member can also be arranged at the beginning and at the end of the final drying. A sample removing device is advantageously arranged at the beginning and at the end of the final dryer for optimal control of the entire drying process.

The invention is explained in more detail in the following with reference to several embodiment examples.

Figure 2:
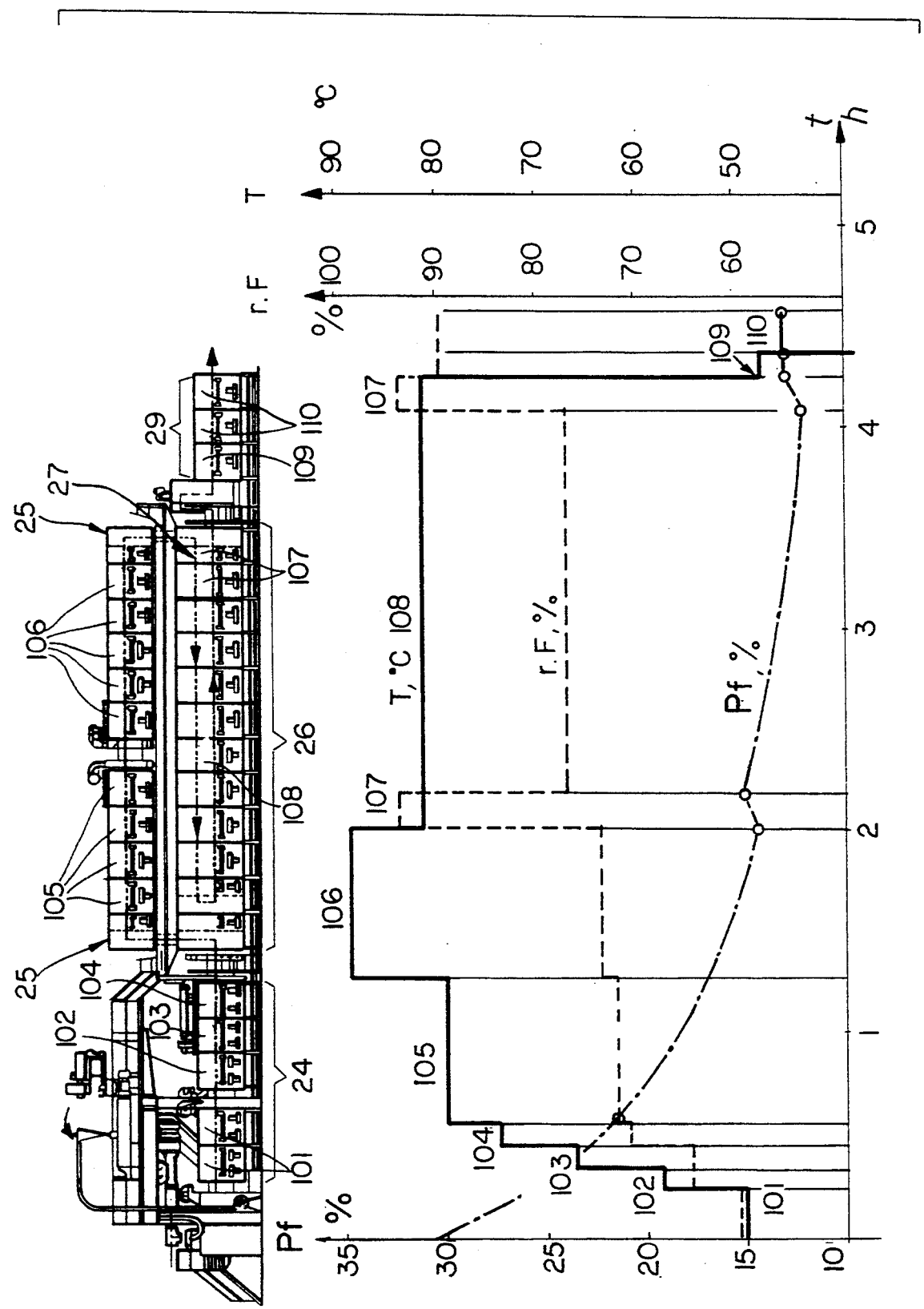
Figure 3:
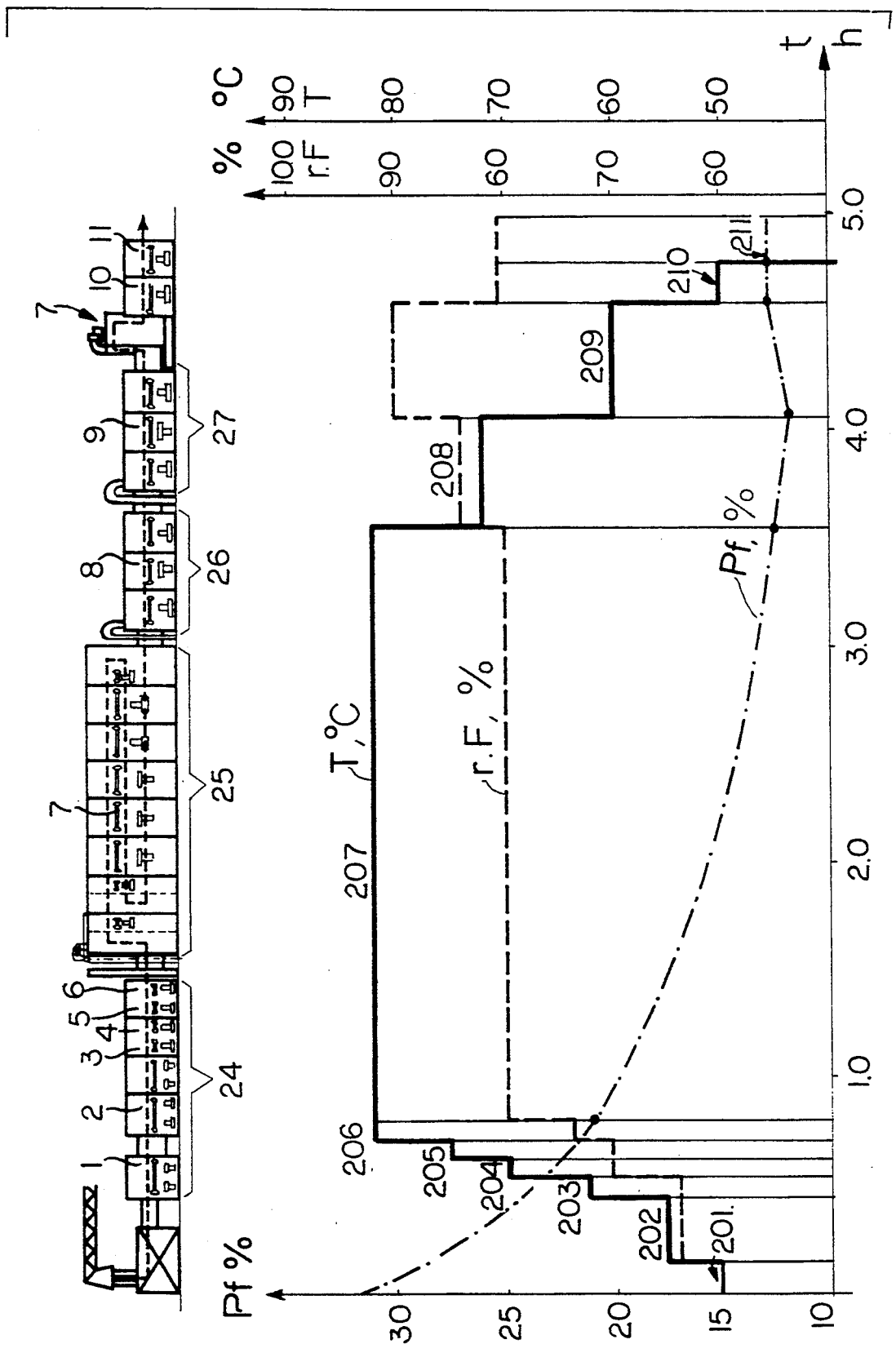
Figure 4:
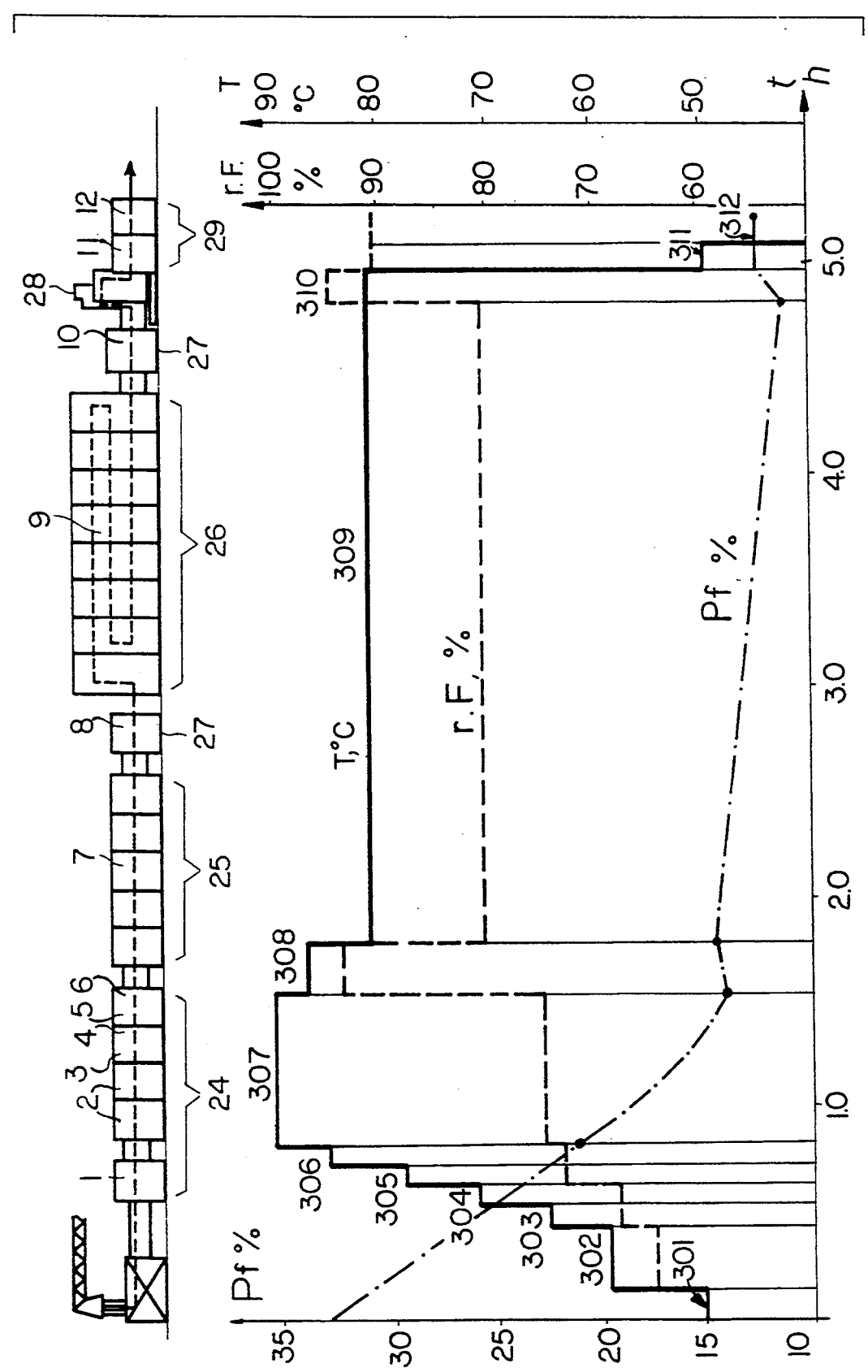
Figure 5:
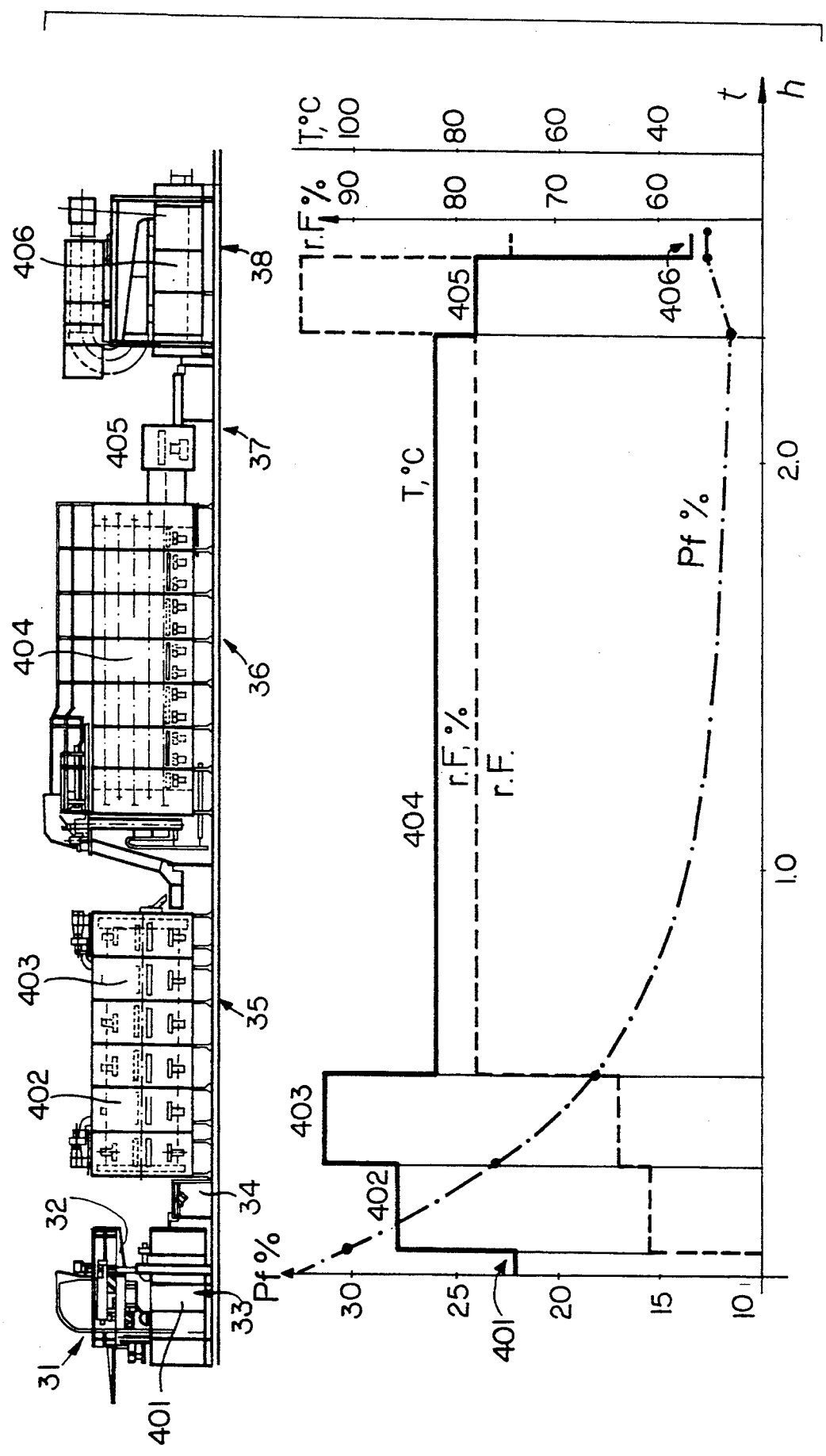
Figures 6, 7:
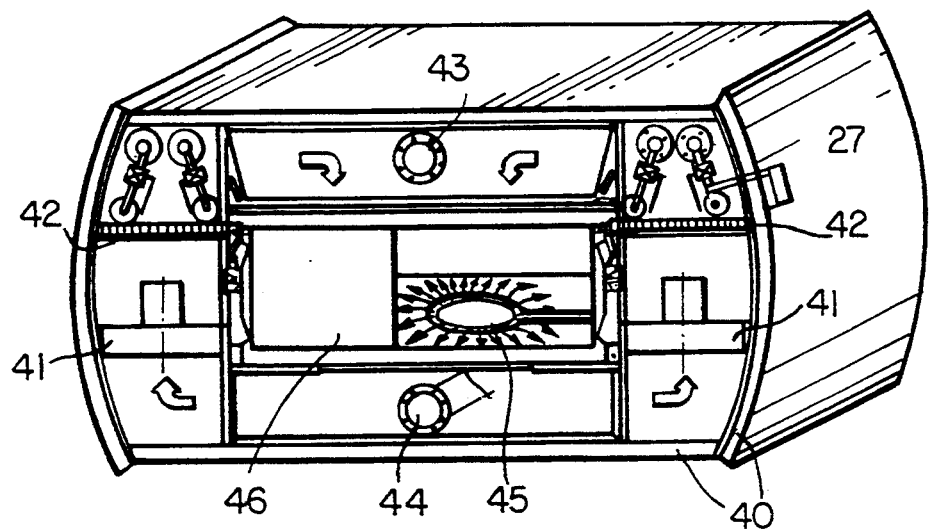

FIG. 1 shows drying of long pasta;
FIG. 2 shows a variant of FIG. 1;
FIG. 3 shows a stepwise temperature reduction for long pasta with the addition of water;
FIG. 4 shows a drying of long pasta with two water additions;
FIG. 5 shows drying of short pasta;
FIG. 6 shows a simple water addition member;
FIG. 7 shows a water addition member for meeting the highest requirements.

In the following, reference is made to FIG. 1 in which the main drying parameter is shown in the form of a graph in the bottom half of the drawing and a pasta production line is shown in the top half of the drawing.

A long pasta press 21 is mounted on a frame 22. After a hanger or spreader 23, the long pasta, not shown, pass through a heating zone 24 including the climate zones 1–6. A main dryer 25 includes the main drying zones 7 and 8 and a final or finishing dryer 26 contains a climate zone 9. The finishing dryer 26 is followed by a water addition member 27 with a climate zone 10 and a climate lock 28 and a cooling arrangement 29 with climate zones 11 and 12.

The graph shows the air temperature T in a solid line, the relative humidity r.F of the air in a dashed line and the water content of the product or product humidity Pf in a dash-dot line.

According to the graph in FIG. 1 the heating zone 24 is divided into 6 different climate zones 1 to 6. The main dryer 25 has the two climates 7 and 8. After climate zone 8, the temperature is reduced from approximately 90° C. to approximately 82° C., the product moisture content in this location having already been reduced to below 14%. Following the main dryer is the finishing dryer 26 in which the temperature is kept constant at approximately 82° C. and the relative air humidity r.F at approximately 80% (climate zone 9). A slight moistening of the product is effected in the water addition member 27 at a climate of e.g. 70° C. and 95% relative humidity (climate zone 10). The cooling arrangement 29 follows the climate lock 28. The temperature is reduced to below 50° C. in the first cooling zone 11 and to below room temperature in a second cooling zone 12.

Another type of processing is shown in FIG. 2. The heating zone 24 is divided into 4 climate zones 101 to 104. The main dryer 25 includes the climate zones 105 and 106. A water addition member 27 is arranged in the finishing dryer 26, climate zone 107. This water addition member 27 adds water at the beginning and at the end of the finishing drying. The cooling arrangement 29 has the same function as described in FIG. 1, also with two climate zones 109 and 110. The second climate zone 110 is not shown in its entirety in the graph.

FIG. 3 shows another interesting construction. The temperature of the product is lowered in stages in temperature reduction zones 208, 209, 210 and 211 from approximately 80° C. to approximately 40°–30° C. The addition of water is effected in zone 209 at a temperature of 60° C.

FIG. 4 shows two separate water addition members 27 (climate zones 308 and 310) immediately following the main drying and prior to the cooling arrangement 29 with climate zones 311 and 312.

FIG. 5 shows a production line for short pasta. The press 31 which stands on the frame 32 transfers the cut short pasta directly to a preliminary dryer 33 (climate zone 401) from which they are fed into a drum dryer 35 via a vibrator 34 (climate zones 402 and 403). The product passes from a drum dryer 35 into a short pasta finishing dryer 36 (climate zone 404) and after exiting at the outlet of the finishing dryer 36 is guided into a short pasta water addition member 37 (climate zone 405) from which they are transferred to a cooling arrangement 38 (climate 406).

A water addition member 27 is shown in FIG. 6. The members required for the climate conditioning, such as ventilators 41, heating elements 42, fresh air and exhaust air lines 43 and 44 and a ring line 45 for supplying the processing space 46 with the water or vapor required for moistening the air, are located in a housing insulated by plates 40.

The water addition member 27 with an additional external air conditioning system 50, the so-called turbo system, is shown schematically in FIG. 7. With this system a determined amount of air is guided outside the processing space 52 by means of a ventilator 51 and conditioned in a moistening segment 53. The turbo system further includes an exhaust ventilator 54 and a heating element for fresh air 55 with the required regulating flaps 56.

We claim:

1. In a process for stabilizing the shape of a pasta product, wherein the product is pressure molded from dough with an approximate water content of 28% to 35% at an initial temperature, heated to temperatures higher than said initial temperature, and then dried, the improvement comprising the steps of:

increasing water content of an outer layer of the product by at least 0.1% and at most 2% in a water addition climate zone at least at a rear end of a final drying zone while the product is still warm by adding water to the surface of the product by raising the humidity of the climate surrounding the product; and subsequently, immediately reducing the temperature of the product after addition of water to below 60° C.

2. The process of claim 1, wherein the water content of said outer layer of the product is increased by at least 0.4% to at most 1.2%.

3. The process of claim 1, wherein the temperature of the product after addition of water is below 30° C.

4. The process of claim 2, wherein the temperature of the product after addition of water is reduced to below 30° C.

5. Process according to claim 1 or claim 2 or claim 3 or claim 4, wherein the addition of water is effected at a product temperature of more than 60° C.

6. Process according to claim 1 or claim 2 or claim 3 or claim 4, wherein long pasta are heated in less than 1 hour to more than 80° C. and then dried at a high temperature in 2 to 4 hours down to about 13% relative humidity.

7. Process according to claim 1 or claim 2 or claim 3, wherein short pasta are heated in less than 30 minutes to more than 80° C. and dried at high temperatures in 1 to 3 hours.

8. Process according to claim 1 or claim 2 or claim 3 or claim 4, wherein the addition of water is effected over a period of 3 minutes to 20 minutes.

9. Process according to claim 1 or claim 2 or claim 3 or claim 4, wherein the addition of water is effected prior to final drying at less than 18% water content of the pasta product.

10. Process according to claim 1 or claim 2 or claim 3 or claim 4, wherein water is added to the surface of the product after main drying for a period of 5 to 10 minutes at a product moisture content of less than 15%.

11. Process according to claim 1 or claim 2 or claim 3 or claim 4, wherein the addition of water is effected in a water addition zone by water vapor or mist via circulating air, wherein the climate at an inlet into the water addition zone is above 80% relative humidity at a temperature of more than 60° C.

12. The process of claim 5 wherein the addition of water is effected at a product temperature of more than 75° C.

13. The process of claim 5, wherein the addition of water is effected over a period of 5 to 10 minutes.

* * * * *